Feb. 6, 1962   A. I. APPLETON   3,020,332
PULLING ELBOW
Filed July 21, 1959   2 Sheets-Sheet 2
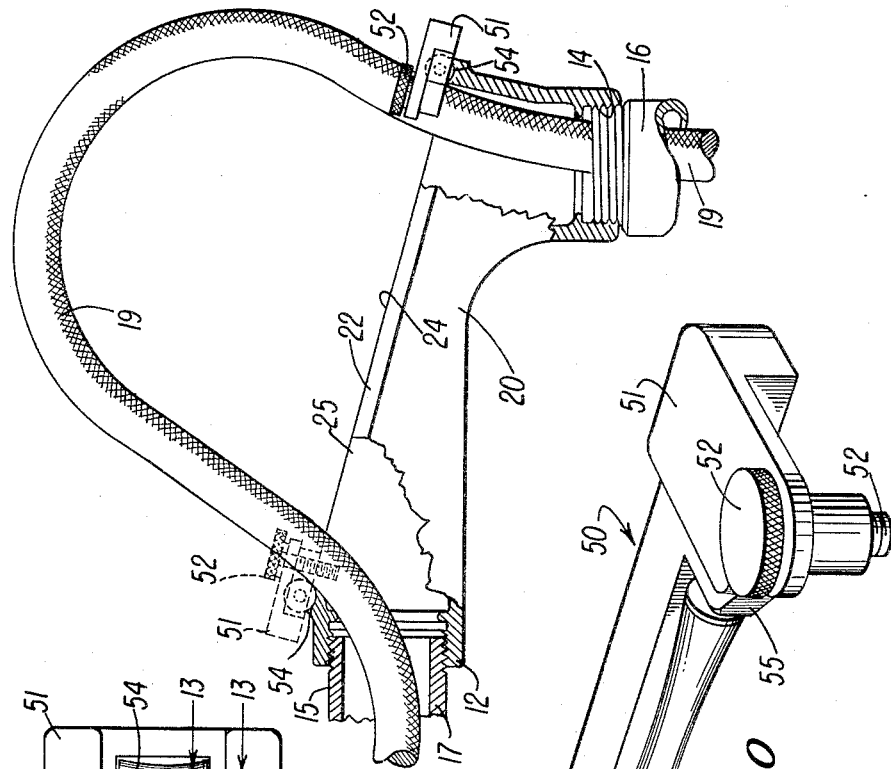
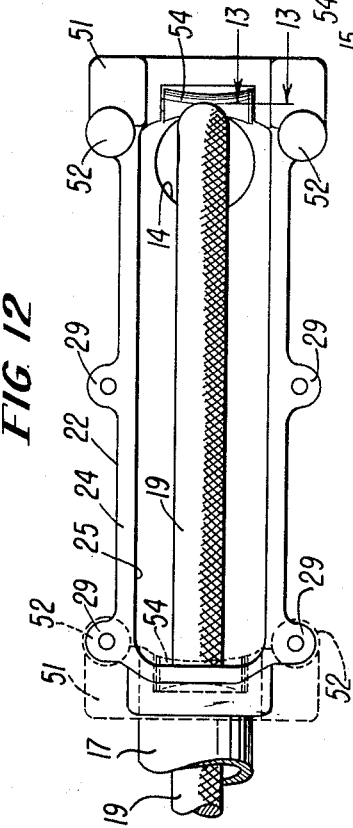
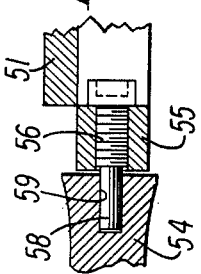
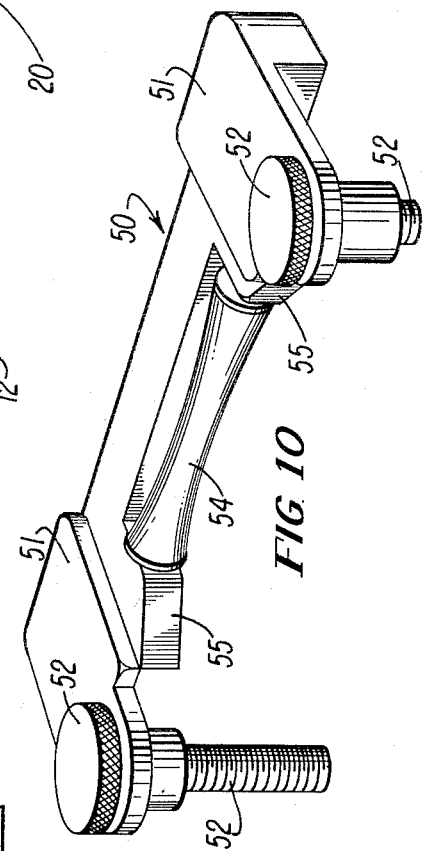
INVENTOR.
Arthur I. Appleton
BY
Attys.

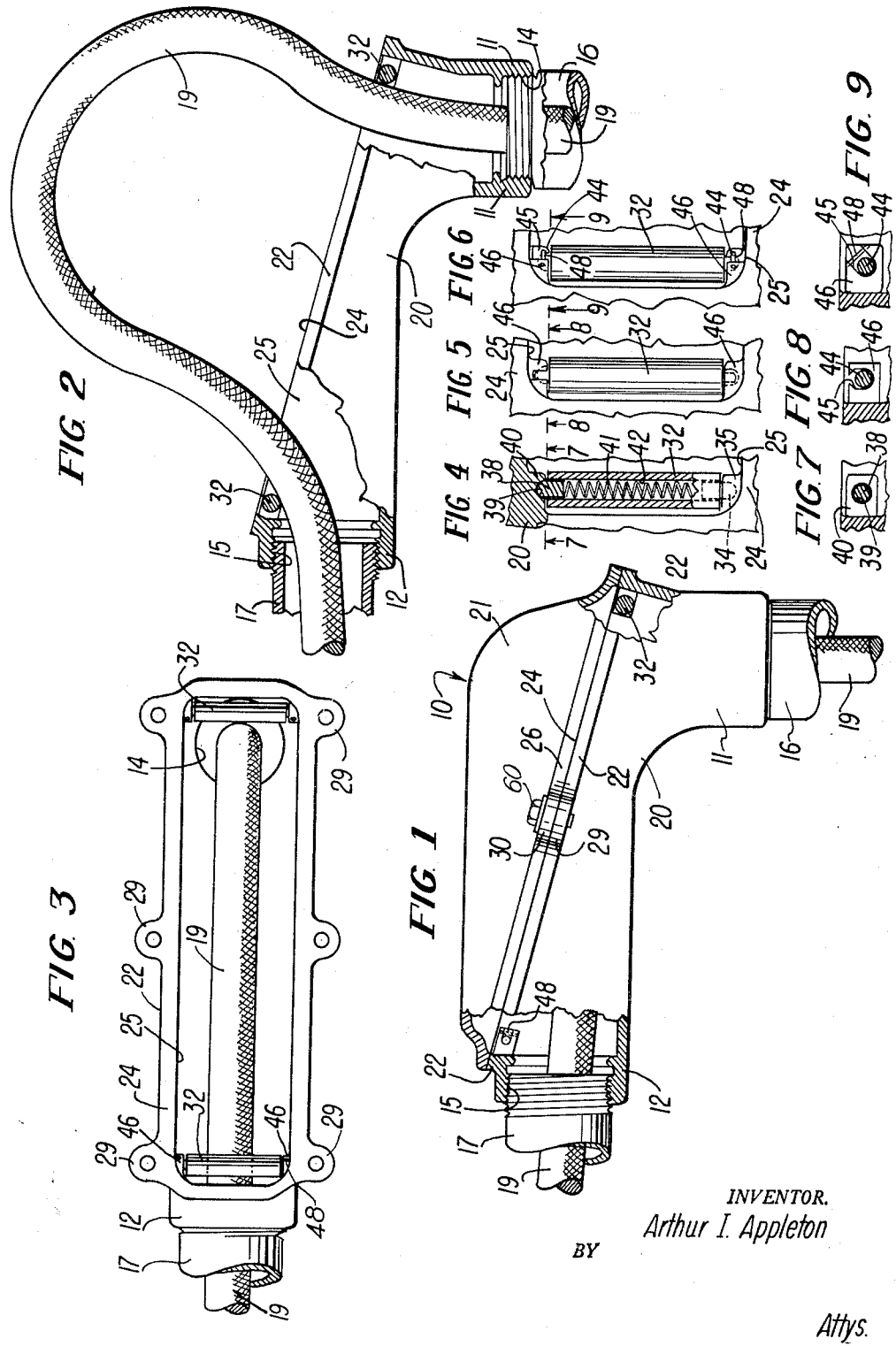

United States Patent Office 3,020,332
Patented Feb. 6, 1962

3,020,332
PULLING ELBOW
Arthur I. Appleton, 1713 Wellington Ave.,
Northbrook, Ill.
Filed July 21, 1959, Ser. No. 828,498
5 Claims. (Cl. 174—72)

The present invention relates to fittings for use with electrical conduit, and more particularly to a pulling elbow finding particular but not exclusive utility for use in the running of heavy electrical cable through large diameter rigid explosion-proof conduit.

The present invention further relates to an attachment for use on pulling elbows installed in connection with large size heavy duty rigid conduit in an existing installation.

In wiring with heavy duty electrical cable of the character having mineral or rubber insulation thereon covering a plurality of conductors, it is conventional practice first to install conduit runs which consist of heavy wall pipe of conduit, usually having a diameter in the range of 3 inches, joined by appropriate fittings to junction boxes, switch boxes, outlet boxes and the like. Following the installation of conduit, insulated conductor cables are pulled through the conduit. It is frequently necessary to locate adjacent conduit sections in angular relation to each other as when the direction of the conduit run is changed. Conventional fittings known as elbows are used to join adjacent angularly related conduit sections.

In pulling a heavy insulated cable, such as a cable having a diameter of about ¾ to 1 inch through a conduit run, the cable tends to bind within the elbow fittings because of the relatively sharp change of direction. To alleviate this difficulty, the elbow is often formed with an access opening closed by a removable cover. By removing the cover, a loop of the cable can be formed extending outwardly through the access opening. In this manner during the pulling of the cable it is bent through a relatively large radius and can be fed easily from one conduit section to the other.

It is a primary object of the present invention to provide an improved pulling elbow for use with large, heavy duty, rigid conduit carrying a heavy cable. More specifically, it is an object of the invention to provide an improved pulling elbow which prevents the cable from chafing or from being cut or otherwise damaged as it is pulled through the conduit and elbow.

Another object of the present invention is to provide a pulling elbow of the foregoing character which is simple and economically constructed to provide a minimum of wear on the cable. A further object is to provide a pulling elbow of the above type in which friction and wear between the edges of the elbow and the cable are substantially reduced.

A related object of the invention is to provide an improved apparatus for use in pulling cable through a pulling elbow and heavy duty conduit. More specifically, it is a related object of the present invention to provide an attachment for use on existing pulling elbows to facilitate the pulling of heavy duty insulated cable therethrough. It is a further object of the invention to provide an attachment which is easily attached for use on large size pulling elbows already installed in existing installations.

Other objects and advantages of the present invention will become apparent as the following description proceeds taken in connection with the drawings wherein:

FIGURE 1 is an elevation view, partly in section, of a pulling elbow fitting embodying the present invention.

FIG. 2 is an elevation view, partly in section, of the fitting shown in FIG. 1 with the cover portion of the housing removed and showing a loop of cable being passed therethrough.

FIG. 3 is a plan view of the fitting shown in FIG. 1 with the cover portion of the housing removed.

FIGS. 4, 5 and 6 are fragmentary views illustrating three modifications of the elbow shown in FIG. 1.

FIGS. 7, 8 and 9 are section views taken substantially in the planes of lines 7—7, 8—8 and 9—9 on FIGS. 4, 5 and 6 respectively.

FIG. 10 is a perspective view of a pulling elbow attachment device for use on pulling elbows to facilitate the passing of cable therethrough.

FIG. 11 is an elevation view, partly in section, of a pulling elbow fitting having the attachment device shown in FIG. 10 mounted thereon and illustrating a loop of cable being pulled through the fitting.

FIG. 12 is a plan view of the fitting and cable shown in FIG. 11.

FIG. 13 is a section view taken substantially in the plane of line 13—13 on FIG. 12.

While certain illustrative pulling elbow fittings and a novel attachment for pulling elbows has been shown in the drawings and will be described below in considerable detail, it should be understood that there is no intention to limit the invention to the specific forms disclosed. On the contrary, the intention is to cover all modifications, alternative constructions, equivalents, and uses falling within the spirit and scope of the invention as expressed in the appended claims.

There is illustrated in the drawings a heavy duty explosion-proof pulling elbow 10 comprising a generally L-shaped hollow tubular housing having leg portions 11, 12 extending at substantially right angles to each other and each formed with an opening 14, 15 respectively for receiving an inserted end of a conduit 16, 17 respectively. It will be appreciated that the conduit of the type herein contemplated is of approximately 3 inches in diameter and is of a character referred to in the electrical trade as heavy duty rigid conduit. The conduit is conventionally threaded into engagement with the pulling elbow and appropriate mating threads are provided for this purpose.

The pulling elbow is preferably of explosion-proof construction, being formed of high-strength material which will confine any explosion to within the conduit. Contained within the conduit and pulling elbow is a heavy duty insulated cable 19 composed of a plurality of conductors (not shown) and presenting an outer sheath of mineral or rubber insulation. Such cable is usually about ¾ to 1 inch in diameter and it will be appreciated that the cable is extremely heavy and difficult to turn around sharp bends such as 90° angles often encountered in most wiring installations. To facilitate feeding such cable 19 through rigid, heavy duty conduit, a pulling elbow 10 of the type herein described is provided where the cable is to make a bend such as a right angle bend as shown in the drawings.

The pulling elbow housing 10, which is generally L-shaped for a right angle turn, is separable into a body portion 20 and a cap portion 21 which is removable to expose the conduit, the leg openings 14, 15 and the cable 19. It is desirable to have the leg openings 14 and 15 axially exposed when the cover 21 is removed so that the cable may be fed directly into them from either direction. To this end, the line of separation between the body portion and the cap portion is designed to lie at an angle to the axes of the legs 11, 12, and slopes generally from one opening to form a relatively shallow body portion 20 and a relatively deep cap 21.

To further facilitate the pulling of cable through the fitting the portion of the housing adjacent the shorter leg 11 is desirably tapered outwardly as shown in FIGS. 3 and 11.

The body portion 20 is formed with a rim 22 having a flat sealing surface 24 and defining a cable access opening 25. The cap 21 is formed with a similar rim 26 and flat sealing surface 28 which corresponds in width to the sealing surface 24 of the body portion 20. The sealing surfaces are of a sufficient width when the cap and body are secured together so that the sealing surfaces provide an explosion-proof seal. In addition to exposing the openings in the legs it will be appreciated that the sloping access opening is much larger than the opening which would be provided by a line of severance parallel to one of the leg axes.

For attaching the cover to the body, the rims 22 and 26 are provided with sets of corresponding outwardly projecting ears 29 and 30 respectively. The set of ears 29 on the body is conventionally tapped for receiving a threaded machine screw extending through an aperture in the corresponding ear on the cap. As shown in the drawings, these ears are provided adjacent each end of the elongated access opening 25 and intermediate the ends thereof.

In accordance with the above objects, the present invention contemplates the provision of an improved pulling elbow which facilitates the pulling of cable by the use of spaced rollers or friction reducing means at each end of the elongated access opening.

To pull a cable through the pulling elbow a large loop is conventionally formed in the cable as shown in the drawings. For purposes of preventing the cable insulation from being scraped against the edges of the elongated axis opening, there is provided, in accordance with the present invention, a roller 32 mounted at each end of an axis opening and extending transversely to the longitudinal axis of the opening. The rollers are placed at each end of the access opening 25 for engagement by the cable as the cable loop is formed. The rollers enable the cable to slide easily past the edges of the opening and, being rounded and smooth, prevent the cable insulation from being damaged by the edges of the rim 22 defining the opening 25.

There is shown in FIGS. 4–9 three illustrative mountings for holding the roller in the elbow. In FIGS. 4 and 8, the roller 32 is provided at one end with a rigid pin 34 fixed thereto and positioned in an opening in an internal projection 35 at the mouth of the access opening 25. At its other end the roller 32 is provided with a spring mounted pin 38 engageable in a hole 39 in a second projection 40 in the access opening opposite the first projection 35. The pin 38 is biased outwardly by a spring 41 positioned in a central bore 42 through the body of the pin 32. The spring acts against the first pin 34 as a stop and urges the second pin 38 outwardly with sufficient force to prevent the cable from pushing the roller out of the elbow.

An alternative mounting for the roller is shown in FIGS. 5 and 8. In this modification the roller is formed with two projecting pins 44 which are received in respective slots 45 in projections 46 extending inwardly from the housing adjacent the access opening 25. The upper edges of the slots 45 are peened over as shown in FIG. 8 so that the roller is securely mounted within the housing.

In FIGS. 6 and 9 the roller is mounted in a manner similar to that shown in FIGS. 5 and 8 except that instead of peening the edges of the housing slot 45 a small pin 48 is inserted between the walls defining the slot 45 and the ends of the pin are bent or peened to hold it in the opening. To facilitate the tightening of the pins in place, the slot 45 is cut at an angle with respect to the access opening.

In many instances it is desired to rewire conduit already installed with pulling elbows which are not equipped with the rollers defined above. In order to position rollers for use with pulling elbows of the conventional type already installed in the field, there is shown in FIGS. 10–13 a roller attachment 50 which can be secured to the pulling elbow at each end of the access opening therein.

This attachment comprises a generally U-shaped member having a machine screw 52 rotatably mounted at each end of the U and engageable with the cover attaching ears 29 conventionally found on pulling elbows.

For engaging the cable loop as it is pulled through the elbow, the attachment 50 is provided with a suitable roller 54 rotatably mounted between the legs or arms of the U-shaped frame 51. As the cable passes through the pulling elbow it is guided by the roller 54 which is preferably tapered toward the center so that the cable will be guided into the center of the conduit. In this way the cable is spaced from the rough edges of the elbow so that the cable insulation is not damaged thereby. One method of mounting the roller in the U-shaped member is illustrated in FIG. 13. To this end, the frame 51 is provided with a pair of spaced downwardly extending shoulders 55 which are tapped for receiving a screw member 56 having a pin 58 on the end thereof for rotatably engaging within an appropriate recess 59 in the end of the roller 54.

In order to use the attachment 50, it is a simple matter to hold it against the open pulling elbow adjacent the access opening and engage the screws 52 with the apertures in the ears 29 adjacent the ends of the access opening. Two attachments are generally employed, one being fixed adjacent each end of the access opening. As the cable is pulled through the elbow the edges of the cable ride along the rollers 54 and are held away from the edges of the elbow defining the access opening. When the cable has been pulled into place, the fittings 50 are removed, the cover 21 is positioned over the access opening, and the necessary machine screws 60 (FIG. 1) are tightened into place through the ears 29 and 30.

I claim as my invention:

1. A pulling elbow for providing a substantially right angle bend in large diameter heavy wall rigid conduit containing heavy insulated cable comprising a generally L-shaped separable housing having a conduit receiving end opening in each leg with the axis of each leg and its opening intersecting at about a right angle within its housing, means for separating said housing along a plane defining an elongated access opening axially exposing said leg openings, a pair of smooth surfaced rollers, and means journaling a roller of said pair at each end of the elongated access opening so that said rollers extend transversely to the leg axes and at least partially over said access opening for guidably engaging a cable being pulled through the pulling elbow.

2. A pulling elbow for providing a substantially right angle bend in large diameter heavy wall rigid conduit containing heavy insulated cable comprising a generally L-shaped separable housing having a conduit receiving end opening in each leg with the axis of each leg and its opening intersecting at about a right angle within the housing, means for separating said housing along a plane sloping from one leg towards the other and intersecting both of said axes, said housing defining an elongated access opening lying in said plane and axially exposing said leg openings, a pair of smooth surfaced rollers, and means rotatably mounting a roller of said pair of each end of the elongated access opening so that said rollers extend transversely to the leg axes and at least partially over said access opening for guidably engaging a cable being pulled through the pulling elbow.

3. A pulling elbow for providing a substantially right angle bend in large diameter heavy wall rigid conduit containing heavy insulated cable comprising a generally L-shaped separable housing having a conduit receiving end opening in each leg with the axis of each leg and its opening intersecting at about a right angle within the housing, means for separating said housing along a plane sloping from one leg towards the other and intersecting both of said axes, said housing defining an elongated access opening lying in said plane and axially exposing said leg openings, a pair of transversely spaced projections extending inwardly from said rim at each end of said elongated access opening, each projection having a slot therein, and a pair of smooth surfaced rollers each having a pin extending from each end thereof journaled in a respective slot in said projections so that said rollers extend transversely to the leg axes at each end of said elongated access opening and at least partially over said access opening for guidably engaging a cable being pulled through the pulling elbow.

4. A cable guide for use with a pulling elbow providing a substantially right angle bend in large diameter heavy wall rigid conduit containing heavy insulated cable, said elbow being formed as a generally L-shaped separable housing, having a conduit receiving end opening in each leg with the axis of each leg and its opening intersecting at about a right angle within the housing, said housing including a body having means defining an elongated access opening with a pair of outwardly directed spaced ears adjacent each end thereof, said cable guide comprising a generally U-shaped body member defining a pair of extending arms, means on said body member for removably attaching the same to said pair of the elbow ears adjacent one end of the elbow access opening, and a roller journaled on said body member to overlie the access opening when the member is mounted on the elbow for guidably engaging a cable being pulled through the elbow.

5. In an angular pulling elbow for providing an angular bend in large diameter heavy wall rigid conduit containing heavy insulated cable, said pulling elbow having an elongated access opening and a pair of outwardly directed spaced ears adjacent each end of the opening, said ears each having a tapped hole therethrough, a cable guide removably attached to said ears at each end of the opening, said cable guide comprising a generally U-shaped body member defining a pair of spaced legs, a screw rotatably mounted in each leg and having a threaded portion for engaging corresponding ones of the elbow ears, and a roller journaled between said legs and adapted to overlie the elbow access opening when the support member is mounted on the elbow by the engagement of said screws in a corresponding pair of ears, said roller guidably engaging a cable being passed through the elbow.

References Cited in the file of this patent
UNITED STATES PATENTS

| | | |
|---|---|---|
| 356,152 | Munsie | Jan. 18, 1887 |
| 2,076,650 | Kettron | Apr. 13, 1937 |